United States Patent [19]

Papson

[11] Patent Number: 5,539,783
[45] Date of Patent: Jul. 23, 1996

[54] NON-COHERENT SYNCHRONIZATION SIGNAL DETECTOR

[75] Inventor: John C. Papson, Melville, N.Y.

[73] Assignee: Hazeltine Corporation, Greenlawn, N.Y.

[21] Appl. No.: 444,138

[22] Filed: May 18, 1995

[51] Int. Cl.$^6$ ...................................................... H04L 7/00
[52] U.S. Cl. ......................... 375/355; 375/365; 370/108
[58] Field of Search .................................. 375/365, 368, 375/355, 359, 360; 348/532, 732, 533; 327/23

[56] References Cited

U.S. PATENT DOCUMENTS

| | | | |
|---|---|---|---|
| 3,495,077 | 2/1970 | Hiltz et al. | 324/77 |
| 3,883,729 | 5/1975 | de Cremiers | 235/181 |
| 4,064,361 | 12/1977 | Kustka et al. | 178/69.1 |
| 4,394,758 | 7/1983 | Donne | 370/105 |
| 4,638,497 | 1/1987 | Komatsu et al. | 375/116 |
| 5,066,877 | 11/1991 | Hamano et al. | 307/603 |
| 5,251,238 | 10/1993 | Menk et al. | 375/106 |
| 5,347,548 | 9/1994 | Messerges et al. | 375/116 |

OTHER PUBLICATIONS

Donald L. Schilling, Charles Becone, *Electronic Circuits: Discrete and Integrated*, McGraw–Hill, Inc., 1989, pp. 747–748.
Paul M. Chirlian, *Analysis and Design of Integrated Electronic Circuits*, Harper and Row, NY, 1981, pp. 898–901 and 662–665.

*Primary Examiner*—Stephen Chin
*Assistant Examiner*—Don Vo
*Attorney, Agent, or Firm*—E. A. Onders; L. Zucker

[57] ABSTRACT

A system and technique for detecting a recurring signal, for example, a synchronization pulse contained in an information signal stream modulated on a carrier signal, wherein the recurring signal has a known duration ($\tau$) and a known period (T). The signal carrier is demodulated such that the recurring signal exhibits a certain characteristic amplitude variation over its duration $\tau$, and the demodulated signal carrier is sampled at intervals less than $\tau$ thereby obtaining signal samples exhibiting the amplitude variation of the recurring signal. The signal samples are applied to an input of a coincidence network including at least one delay circuit which provides a delay corresponding to the period T of the recurring signal to a passing signal sample, and input and output terminals of each delay circuit are coupled to different inputs of an associated coincidence gate circuit. Each coincidence gate circuit produces an output whenever its input signal samples coincide with one another. The number of outputs of all gate circuits are added at each sample interval, and the total numbers obtained are summed over a time window corresponding to the duration $\tau$ of the recurring signal. The recurring signal is defined by detecting peaks obtained when performing the summing step.

25 Claims, 5 Drawing Sheets

NON-COHERENT SYNCHRONIZATION SIGNAL DETECTOR

BACKGROUND OF THE INVENTION

1. Field of the Invention

The present invention relates generally to a technique for detecting a recurring signal contained in an information signal stream, and more particularly to a technique for detecting periodic synchronization signals that frame data packets in a synchronous data signal stream.

2. Description of the Known Art

Telecommunication systems enable information to be communicated from one point to another, by modulating the information in analog or digital form on a radio frequency (RF) signal. The RF signal is then radiated from an antenna having sufficient gain and directivity to ensure that the RF signal can be detected above background noise at the receiving site. Cellular radio telephone systems operate to communicate speech information in analog or digitized form between one of a number of base stations, and a subscriber unit installed in the subscriber's vehicle or carried by the subscriber. Currently, there is a trend toward upgrading existing analog cellular telephone systems by enabling them to handle digitized speech conversations with the added benefit of increased system capacity.

Unlike analog systems, the transmission of speech in a digital communications system requires the insertion of synchronization (sync) flags or signals at known, fixed intervals in a speech data signal stream to allow the information to be decoded with least error at the receiver site. The use of digital communications technology in a cellular radio telephone network enables multiple subscribers to converse over the network simultaneously on a single frequency channel, using, e.g., a time division multiple access (TDMA) scheme. With TDMA, each subscriber has access to the cellular network during an assigned time slot within a data signal frame. When a particular user's time slot is available, the user's speech data may be encoded and transmitted at a greater rate than that needed if the data were allocated over an entire data signal frame.

Because digital speech data originating simultaneously from three or more different subscribers may be transmitted in corresponding time slots of each signal frame, a predetermined sync pulse or burst is used to mark the beginning of each frame. The sync pulses are detected by speech data processors in the network which rely on the timing of the pulses to ensure that the speech data in each of the frame time slots is identified with the proper subscriber. Each sync pulse has a known interval or duration ($\tau$) and repeats in the speech data stream with a known periodicity (T). For example, in a so-called MIRS digital cellular radio telephone system, the frame sync signal recurs every 15 msec and the pulse duration is 0.75 msec. Sync pulses or signals are modulated or encoded on a system RF carrier signal in a given manner. For example, in digital communications systems, sync pulses may be chosen to be phase (PSK), amplitude (ASK), or frequency (FSK) modulated, or both phase and amplitude modulated (QAM).

Certain peripheral equipment made for use with digital communications systems, including but not limited to digital cellular systems, must be able to detect the system sync pulses or signals so that the equipment can operate properly within the system. Such equipment may require input clock or timing signals that are in phase with the system sync signals. The clock signals may be used by the equipment to ensure, for example, that downlink synchronous signals transmitted from a base station are properly routed to a number of mobile receivers.

It may not always be possible to connect or couple the peripheral equipment directly to the system sync signal source, however. Even if a continuous sample of the transmitted data signal stream is obtained, it has still been necessary to derive correlation coefficients by using complex and finely tuned circuit networks, in order to determine the location and timing of the sync pulses in the signal stream.

SUMMARY OF THE INVENTION

An object of the invention is to provide a technique and a system for detecting the presence of recurring signals such as synchronization pulses or signals contained in an information signal stream.

A further object of the invention is to provide a technique and a system for detecting periodic synchronization signals that are used for framing data packets in a data signal stream.

Another object of the invention is to provide a technique for detecting periodic synchronization pulses in a synchronous data signal stream when the synchronization pulse source is not easily accessible.

Yet another object of the invention is to provide a system for detecting periodic synchronization pulses which frame packets of data in a data signal stream, which system can be constructed with simple logic circuitry and yet offer a high degree of detection accuracy.

According to the invention, a method of detecting a recurring signal contained in an information signal stream modulated on a carrier signal, wherein the recurring signal has a known duration ($\tau$) and repeats with a known period (T), comprises the steps of demodulating detecting the carrier signal on which the information signal stream is modulated such that the recurring signal exhibits a certain characteristic amplitude variation over its duration $\tau$, and sampling the demodulated carrier signal at sample intervals less than $\tau$ thereby obtaining signal samples exhibiting the amplitude variation of the recurring signal. The signal samples are applied to an input of a coincidence network including a number of delay circuits each of which provides a delay corresponding to the period T of the recurring signal to a passing signal sample, and input and output terminals of each delay circuit are connected to different inputs of an associated coincidence gate circuit. Each coincidence gate circuit produces an output signal whenever its input signal samples coincide with one another. The total number of output signals from all the gate circuits are determined at each sample interval, and the obtained totals are summed over a time window corresponding to the duration $\tau$ of the recurring signal. The recurring signal is defined by peaks detected during the summing step.

According to another aspect of the invention, a system for detecting a recurring signal contained in an information signal stream modulated on a carrier signal, wherein the recurring signal has a known duration ($\tau$) and repeats with a known period (T), comprises means for demodulating the carrier signal so that the recurring signal exhibits a certain characteristic amplitude variation over its duration $\tau$, means for sampling the demodulated carrier signal at sample intervals less than $\tau$ and for obtaining corresponding signal samples exhibiting the amplitude variation of the recurring signal; and coincidence network means including a number of delay circuit means each of which provides a delay corresponding to the period T of the recurring signal to a passing signal sample, and a corresponding number of coincidence gate circuit means wherein each of the delay circuit means has an input and an output terminal which are connected to different inputs of an associated coincidence gate circuit means. The signal samples output from the sampling means are coupled to an input terminal of the coincidence network means, and each coincidence gate circuit means produces an output signal whenever its two input signal samples coincide with one another. The output signals from all of the gate circuit means are coupled to adding network means which determines a total number of output signals for each sample interval. Output totals from the adding network means over a time window corresponding to the duration τ of the recurring signal, are summed by summing circuit means. Peak detector means defines the recurring signal using peaks detected during operation of the summing circuit means.

For a better understanding of the present invention, together with other and further objects, reference is made to the following description taken in conjunction with the accompanying drawing, and the scope of the invention will be pointed out in the appended claims.

DETAILED DESCRIPTION OF THE INVENTION

Figure 1:
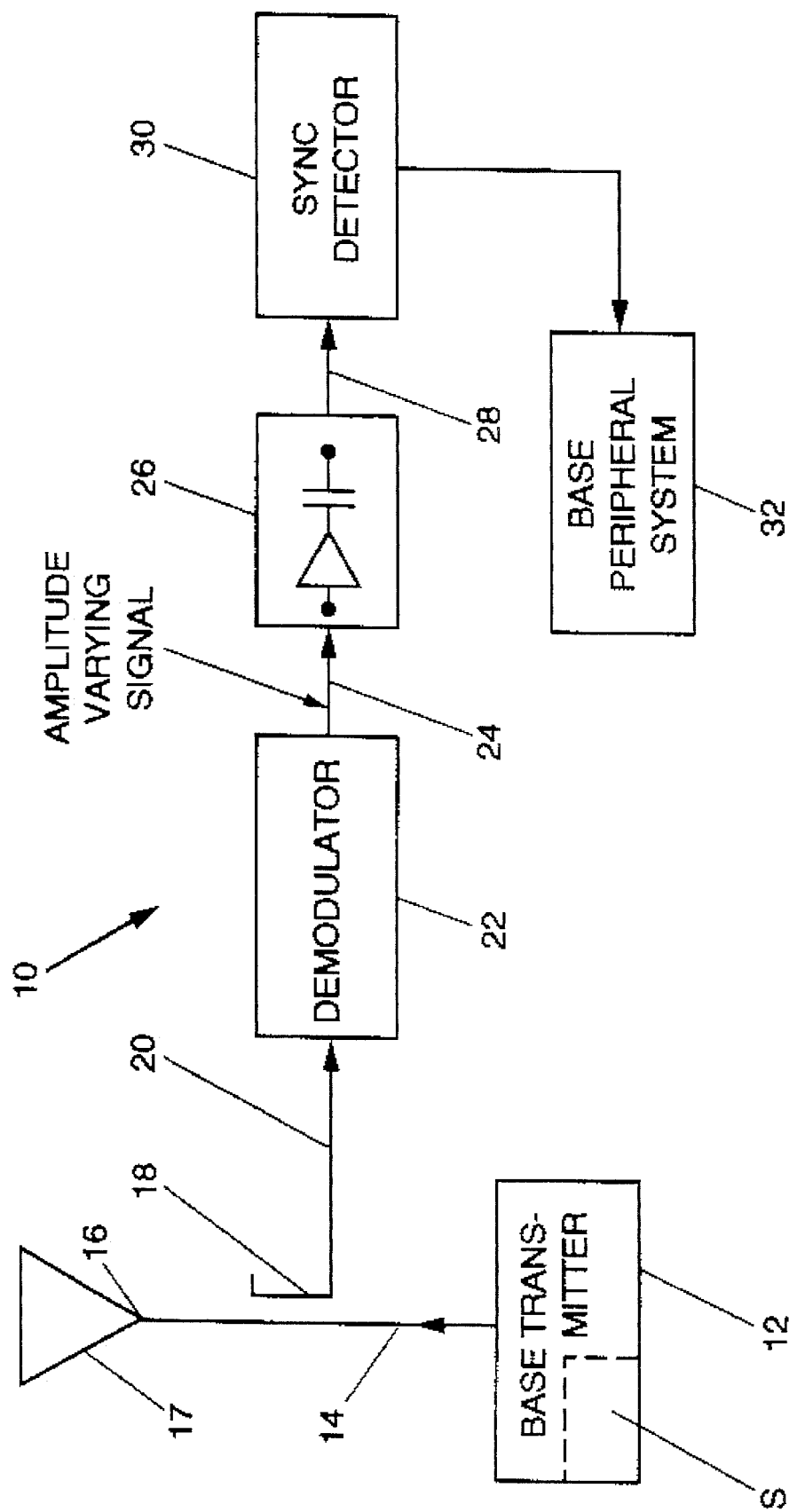
FIG. 1 is a schematic block diagram of a communications system base station at which the present invention can be applied.

FIG. 1 is a schematic block diagram of a base station 10 forming part of a synchronous data communications system. For example, the station 10 may be part of a digital cellular radio telephone system, or any other communications system in which an information signal stream is modulated on a RF carrier signal produced by a base transmitter 12. The modulated RF carrier signal is sent through a transmission line 14 to a feed point 16 for radiation from a transmit antenna 17. Frame sync signals and data framed by the sync signals are modulated on the RF carrier signal in line 14, according to a predetermined modulation scheme. As mentioned, in the case of a digital data communications system, the modulation scheme may be phase shift keying (PSK), amplitude shift keying (ASK), frequency shift keying (FSK), or a combination of phase and amplitude shift keying, for example, quaternary amplitude shift keying (QAM). The frame synchronization signals are generated from a sync signal source S forming part of the base transmitter 12, which source may not always be accessible by the station operator.

According to the invention, an RF coupler 18 is placed in operative relation with the transmission line 14 or the transmit antenna 17. The coupler 18 produces at an output 20 a corresponding coupled information signal stream that is attenuated with respect to the carrier signal in the transmission line 14. The coupler output 20 is connected to an input of a demodulator 22 which operates on the coupled signal to produce at output 24 a signal that exhibits certain amplitude variations in response to the sync and data signals modulated in the coupled signal stream. For example, if the sync signals amplitude modulate the coupled RF signal via ASK or QAM, demodulator 22 may be a conventional envelope detector. If the sync signals are only FSK modulated, demodulator 22 may be a conventional FM detector or discriminator which outputs a signal having an amplitude level that varies with shifts in the frequency of the coupled RF signal.

The output 24 of the demodulator 22 is connected to an AC coupling circuit 26, for example, a buffer having an AC coupling output at 28. The circuit 26 operates to remove any DC component from the amplitude varying signal at the demodulator output 24, and produces a corresponding bipolar signal at the output 28.

The coupling circuit output 28 is applied to an input of a sync detector 30. The detector 30 is explained more fully in connection with FIG. 2, and operates to determine the occurrence of sync signals of known duration T and periodicity T in the modulated RF signal from the base transmitter 12. Clock or timing signals in phase with the communications system sync signal source S are supplied from the detector 30, to operate one or more base peripheral systems 32.

Figure 2:
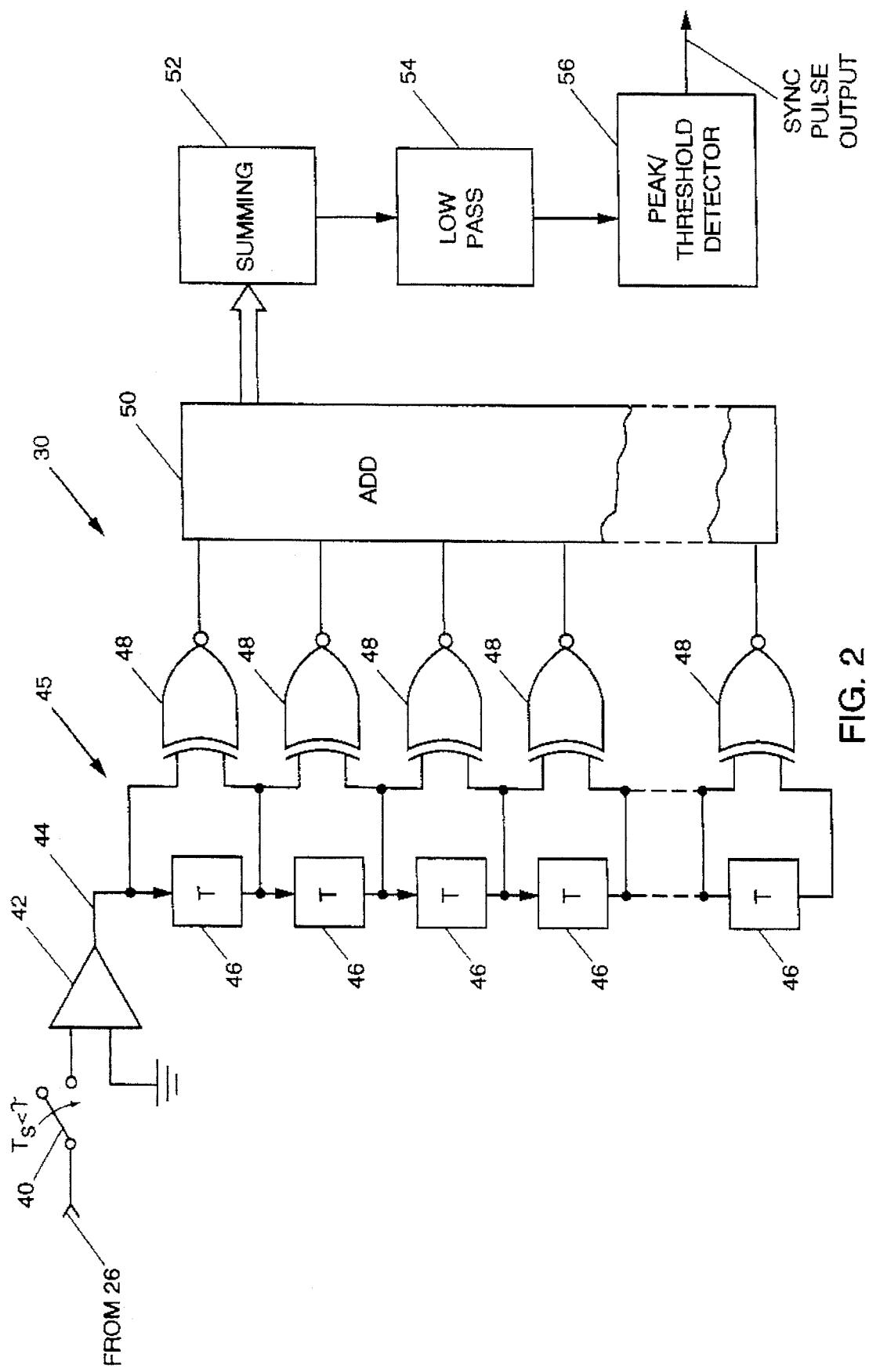
FIG. 2 is a schematic block diagram of a sync detector in the base station of FIG. 1.

FIG. 2 is a schematic block diagram of the sync detector 30 in FIG. 1.

A commutator 40 samples the amplitude varying signals supplied from AC coupling circuit 26, and the commutator provides corresponding signal samples to one input of a comparator 42. A remaining input of the comparator 42 is connected to DC ground for a zero volt reference. The sampling interval Ts of commutator 40 is set to be less than the known sync signal duration τ. For example, in the mentioned MIRS digital cellular system, the frame sync signal duration τ is 0.75 msec and the signal period T is 15 msec. It is preferred that the commutator 40 produce an integer number of samples during the sync signal period T (more than 1000 samples when T=15 msec), and that the clock error for the commutator 40 not exceed 200 ppm (0.003 msec when T=15 msec).

Comparator 42 thus operates to convert signal samples whose amplitudes may vary above and below a zero DC level, to one-bit, unipolar digital logic signals at a comparator output terminal 44. Output terminal 44 is connected to a coincidence network configuration 45 comprised of a stack of cascaded delay circuits 46, and associated coincidence logic gate circuits 48. Each delay circuit 46 provides a signal time delay of 1T. Input and output terminals of each of the delay circuits 46 are connected to respective input terminals of an associated gate circuit 48. Each gate circuit 48 provides a logic "1" output only in response to coincident logic "1" or logic "0" inputs at both input terminals of the gate circuit 48. A logic "1" and a logic "0" input combination, causes the gate circuit 48 to output a logic "0". The gate circuits 48 may also be known as EXCLUSIVE-NOR or inverted EXCLUSIVE-OR gate circuits. The number of delay/gate circuit levels in the coincidence network stack is preferably at least eight.

The outputs of each of the coincidence gate circuits 48 are coupled to an adding circuit 50 which outputs a coincidence total signal representing the total number of logic "1's" produced by the gate circuits 48 for each signal sampling interval. The coincidence total signal from the circuit 50 is applied to a summing network 52 that adds each of the coincidence total signals in a time window equal to the duration τ of the sync signal. An output of the summing network 52 is applied through a low pass filter 54 to a peak/threshold detector 56 which continuously samples the filtered output from the summing network 52. Once the peak/threshold detector 56 detects an output greater than a certain fraction of a stored maximum detected output level, e.g., 75% the detector 56 triggers a clock or timing pulse that is in phase with a corresponding sync signal modulated on the RF carrier signal from the system base transmitter 12 (FIG. 1). The clock pulses are supplied to the base peripheral equipment 32 which then implements certain enhancement features for the base station 10 which features require synchronization with the system sync pulse source S.

An example of the operation of the sync detector 30 now follows. Assume the base transmitter 12 in FIG. 1 transmits a RF signal which is modulated with frames of digital data at 16-level QAM, and the data frames are flagged by sync pulses of duration τ=0.75 msec, and period T=15 msec. The transmitted RF signal with a modulated data signal stream is coupled through coupler 18 to the demodulator 22. Because the sync pulses produce a recurring amplitude shift in the coupled RF signal level, demodulator 22 is a conventional envelop detector circuit and it produces a recurring amplitude varying signal that is characteristic of the sync pulses in the RF signal. As mentioned, if the sync pulses in the transmitted RF signal were only phase or frequency modulated, a suitable phase detector or frequency discriminator circuit would be needed to produce an amplitude varying signal that is characteristic of the sync pulses.

It is also assumed that the information or data modulated in corresponding time slots of successive frames of the transmitted RF signal, differs unpredictably from one frame to the next. That is, it is assumed to be equally probable that a logic "1" or a logic "0" will be modulated at a given position in corresponding time slots of successive frames. Thus, only the sync pulse is known to recur at a fixed rate (T) in the modulated RF signal. The amplitude varying signal characteristic of the sync pulse will therefore recur at the output 24 of the demodulator 22 with the period T. Between the demodulated sync pulses, amplitude level variations at the demodulator output 24 can not be predicted as a function of time because, as mentioned, the modulated information data framed by the sync pulses is not predictable.

The coupling circuit 26 removes a DC component that may be contained in the amplitude varying signal from the demodulator 22, and the coupling circuit 26 supplies a bipolar amplitude varying signal to the input of the sync detector 30 in FIG. 2.

Commutator 40 samples the bipolar varying signal from coupling circuit 26, by sampling the signal at intervals Ts less than the duration τ of the sync pulses. Assuming τ=0.75 msec, the sampling rate is preferably 80 samples per msec which yields 60 samples of the sync pulse, with 1200 total samples in a 15 msec period T. The coupled signal samples are then applied to one input of the comparator 42, and a uni-polar binary logic signal is produced at the comparator output terminal 44. The output signal from comparator 42 is such that when an input signal sample is greater than or equal to zero, the output signal is a "1"; and if the input signal sample is less than zero, the output signal is a "0".

Assume that the signal samples at terminal 44 correspond to information or data modulated at a particular position in a certain time slot of a first frame, and that the corresponding logic state at terminal 44 is a "1". After passage of a one T time period (15 msec), the first frame signal sample "1" is delayed by the sync pulse period T in the topmost delay circuit 46, and the sample is also applied to an input terminal of the topmost coincidence gate circuit 48. The signal sample now at terminal 44 corresponds to data modulated at the same position in the same time slot of a second frame next succeeding the first frame from which the delayed first frame signal sample was obtained. As mentioned, because the data modulated on successive frames of the transmitted RF signal varies unpredictably, the second frame signal sample now at terminal 44 may be either a "1" or a "0", with substantially equal probability.

The second frame signal sample is then applied to the remaining input terminal of the gate circuit 48. Thus, for a number of signal samples obtained every T seconds from a given time slot in successive data frames, it is just as likely that both input terminals of the gate circuit 48 will be at the same state, i.e., both "1's" or both "0's" so that a "1" output will be produced by the gate 48; as it is likely that the gate input terminals will be at different logic states, i.e., one "1" and one "0" to yield a "0" output from gate 48. The delayed first frame signal sample from the topmost delay circuit 46 is also applied to an input of a second level delay circuit 46 which delays the first frame signal sample by an additional period T (15 msec) and applies the twice-delayed sample to one input of the second level coincidence gate 48.

At the same time, the second signal sample from terminal 44, which has been once-delayed by the first-level delay circuit 46, is applied to the other input terminal of the second level gate circuit 48. Again, because it is just as likely that the first and second signal samples coincide with one another as it is that they do not coincide, the second-level gate circuit 48 outputs a "0" or a "1" with substantially equal probability. Signal samples from successive frames continue to propagate down the stack network of delay/coincidence gate circuits. The outputs of all the coincidence gates 48 are added by the network 50, the output of which corresponds to the number of logic "1's" produced by all of the coincidence gates 48 for each sample interval.

Because successive frame signal samples corresponding to data modulated between sync pulses in the RF signal have no predictable correlation with one another, it will be understood that over, for example, eight or more successive signal frames, only about half of the coincidence gate circuits in an eight level stack will produce logic "1's", while the remainder produce logic "0's".

Once the signal samples at terminal 44 correspond to a sync signal which is known to repeat with period T, the same signal samples will appear at terminal 44 every T seconds. Coincidence between samples of the sync pulses taken T seconds apart from one another, will cause each of the gate circuits 48 to produce a "1" output as the coincident samples (either both "1's" or both "0's") propagate down the delay/ coincidence gate circuit stack. Thus, more than half of the coincidence gates 48 will output a logic "1", and the output of the adding circuit 50 will rise suddenly above an average level and hold a maximum level over the duration τ of the sync pulse. Once sync pulse samples are absent from the terminal 44, the output of the adding circuit 50 will quickly fall to a median level until the recurrence of the next sync pulse in the coupled RF signal.

Output values from the adding circuit 50 are added continuously by the summing network 52 in a time window equal to the known duration τ of the sync pulse. When the output of the adding circuit 50 shifts to a maximum level signifying the arrival of a sync pulse, the signal produced by summing network 52 rises steadily until the output of the adding circuit 50 falls to signify the passage of the sync pulse. The output of the summing network 52 steadily decreases to a median level until sampling of the next sync pulse signal by the detector 30 occurs.

The output of the summing network 52 will therefore appear as a series of peaks or epochs which coincide with the sync signals or pulses modulated on the station RF signal, and which peaks are spaced from one another by the sync pulse period T.

The peak/threshold detector 56 then operates to detect peaks in the signal produced by summing network 52, and triggers clock or timing pulses upon detecting peaks having a value in excess of a determined threshold level, e.g., 75% of a maximum detected summing network signal level.

Various components of sync detector 30 may be constructed using conventional logic devices to carry out arithmetic functions, and conventional memory elements for the time delay circuits 46. It will also be apparent to those skilled in the art that the sync detector 30 may be constructed using programmable logic devices in combination with random access memories (RAMs). The detector functions may also be implemented via software algorithm.

Figure 3A:
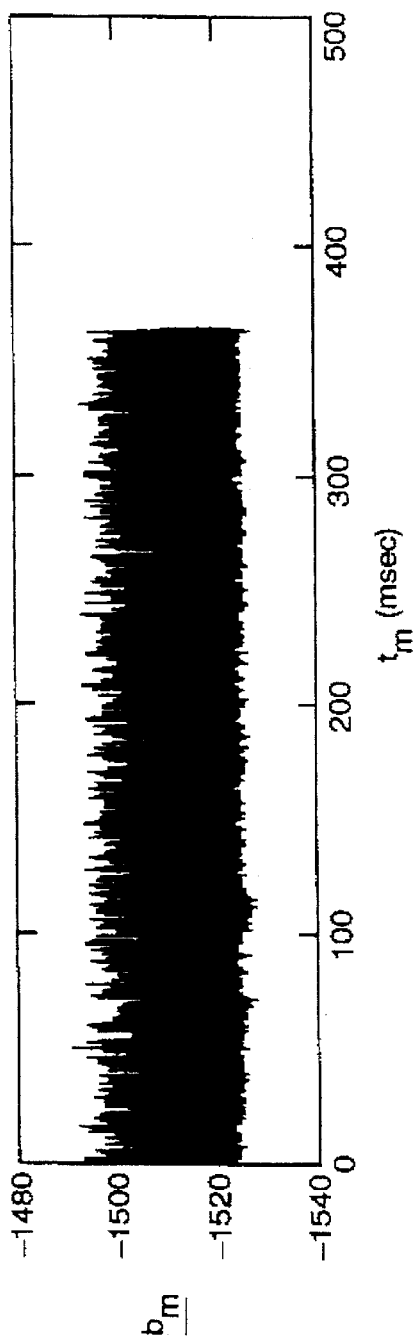
FIGS. 3(a)–3(c) are graphs illustrating the operation of a first configuration for the sync detector of FIG. 2.

FIG. 3(a) is a graph of a typical amplitude varying signal obtained at the demodulator output 24, using an envelope detector for the demodulator 22 and a 16-level QAM synchronous digital cellular radio telephone signal as the signal transmitted from the base transmitter 12 (FIG. 1). The sync pulses have a period T of 15 msec and a duration of 0.75 msec. The sampling rate Ts was set at one sample per 0.0125 msec (1200 samples per 15 msec). An 8-level delay/coincidence gate circuit stack was simulated for use in the detector 30 of FIG. 2, using a "MathCad" simulation.

Figure 3B:
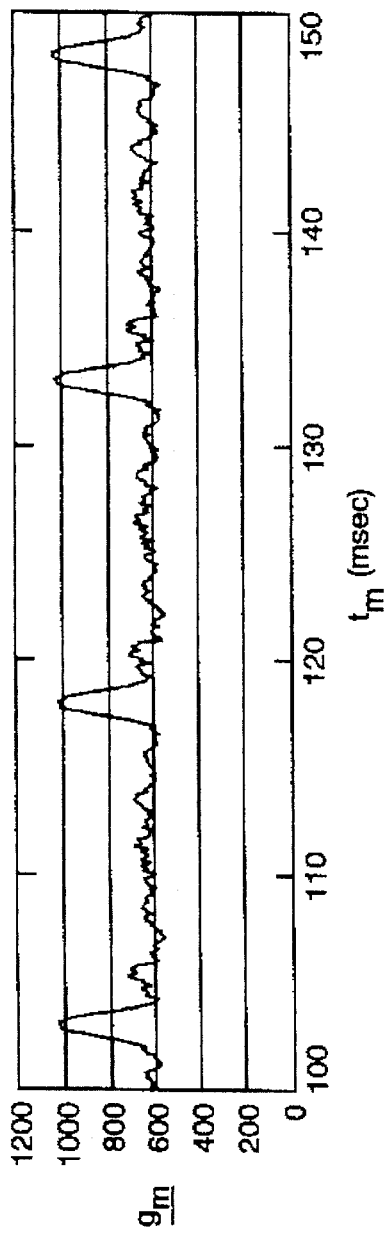

FIG. 3(b) represents the output at an expanded time scale of the summing network 52 in FIG. 2, with the network 52 set to sum the coincidence totals output from adding network 50 over the last 0.75 msec. Peaks or epochs in the summed totals from the network 52 are clearly defined.

Figure 3C:
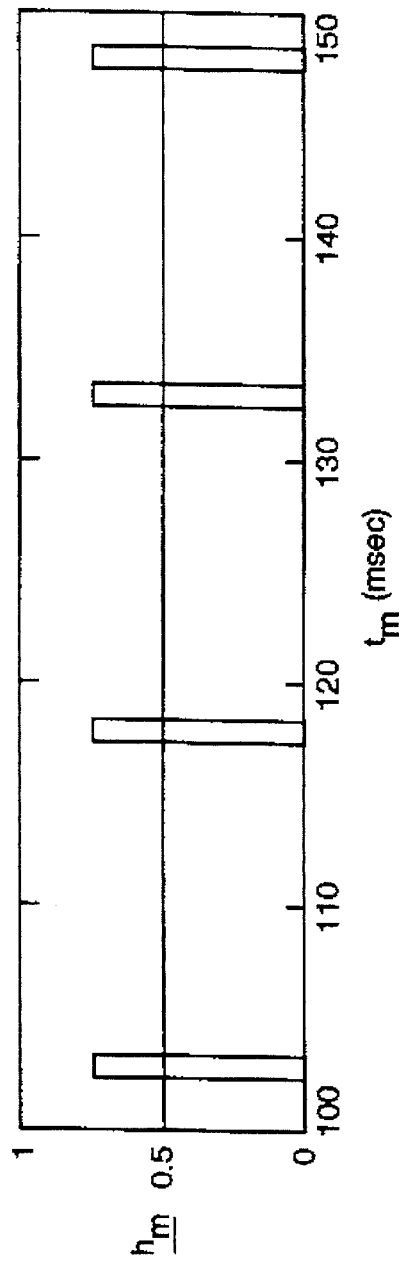

FIG. 3(c) represents the output of the peak/threshold detector 56 at the same time scale as in FIG. 3(b), with the generation of clock pulses in phase with the sync pulses in the envelope signal of FIG. 3(a).

Figure 4A:
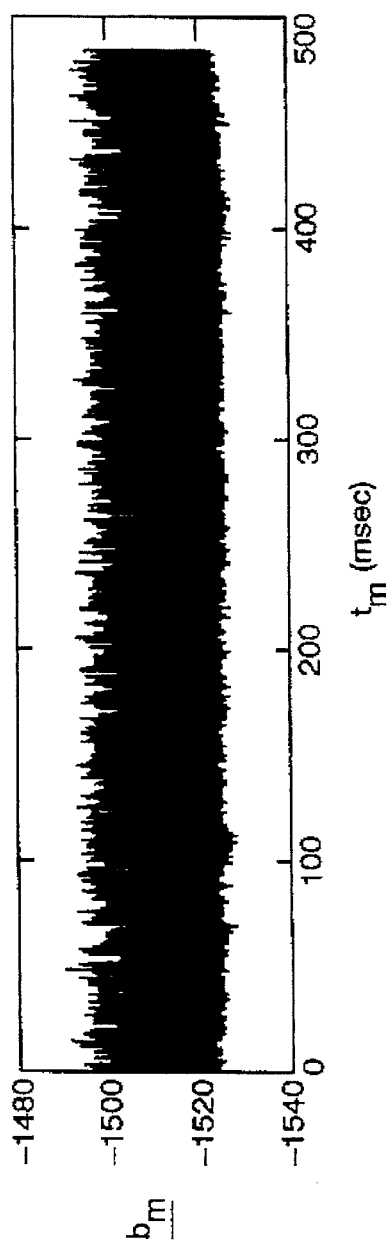
FIGS. 4(a)–4(c) are graphs illustrating the operation of a second configuration for the sync detector of FIG. 2.

FIG. 4(a) is a graph of another typical amplitude varying signal obtained at the demodulator output 24, using an envelope detector for the demodulator 22 and a 16-level QAM synchronous digital cellular radio telephone signal as the signal transmitted from the base transmitter 12 (FIG. 1). The sync pulses have a period T of 15 msec and a duration of 0.75 msec. The sampling rate Ts was set at one sample per 0.0125 msec (1200 samples per 15 msec). A 16-level delay/ coincidence gate circuit stack was simulated for use in the detector 30 of FIG. 2, using a "MathCad" simulation.

Figure 4B:
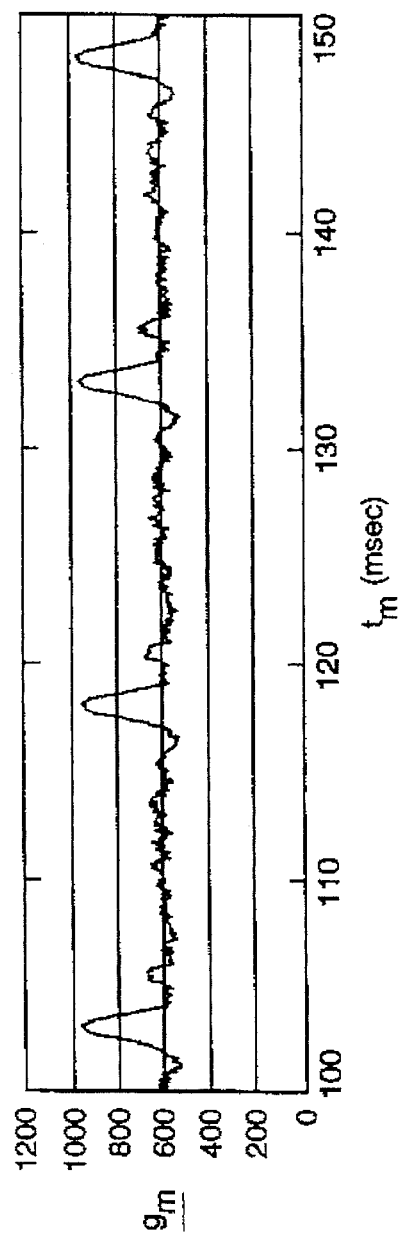

FIG. 4(b) represents the output at an expanded time scale of the summing network 52 in FIG. 2, with the network 52 set to sum the coincidence totals output from adding network 50 over the last 0.75 msec. Peaks or epochs in the summed totals from the network 52 are more clearly defined than in FIG. 3(b).

Figure 4C:
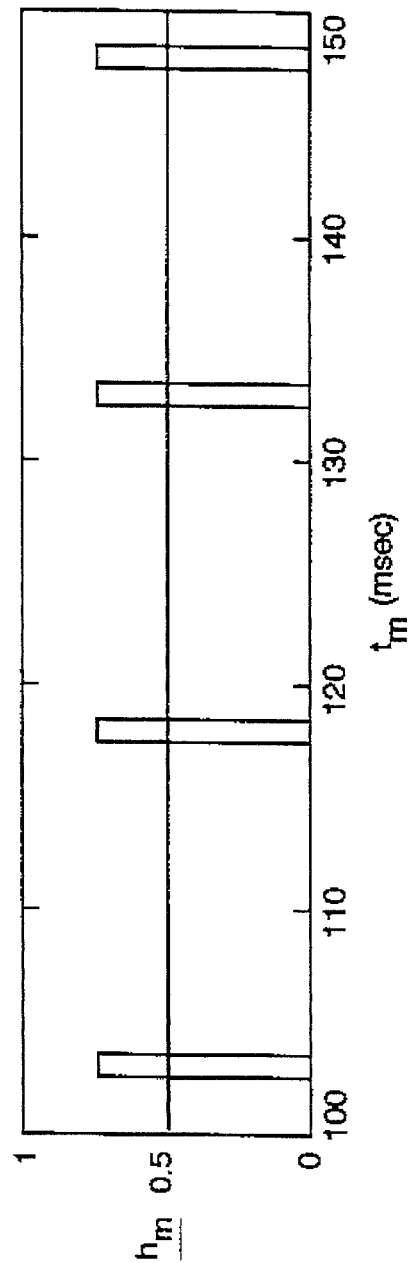

FIG. 4(c) represents the output of the peak/threshold detector 56 at the same time scale as in FIG. 4(b), with the generation of sharp clock pulses in phase with the sync pulses in the envelope signal of FIG. 4(a).

The present invention including sync detector 30 may of course be configured for operation in digital cellular radio telephone systems other than the mentioned MIRS, including but not limited to AMPS and GSM systems in which the sync pulse duration, period and modulation method may differ from the example disclosed herein. In its broader aspects, the present invention enables the detection of any periodically recurring wave form imbedded in a longer, time varying wave form, and it enables synchronization to complex modulation wave forms by using only some of the information conveyed via the wave form, e.g., 16 QAM in conjunction with simple envelope detector.

While the foregoing description represents a preferred embodiment of the invention, it will be obvious to those skilled in the art that various changes and modifications may be made, without departing from the true spirit and scope of the invention as pointed out in the following claims.

I claim:

1. A method of detecting a recurring signal contained in an information signal stream which is modulated on a carrier signal, wherein the recurring signal has a known duration ($\tau$) and repeats with a known period (T), comprising:

supplying a carrier signal with an information signal stream which is modulated on the carrier signal, said information signal stream containing a recurring signal having a certain duration ($\tau$) and repeating with a certain period (T);

coupling said carrier signal to an input of a demodulator;

demodulating the carrier signal coupled to the input of said demodulator such that the recurring signal exhibits a characteristic amplitude variation in a demodulated carrier signal at an output of the demodulator, over the duration $\tau$ of the recurring signal;

sampling the demodulated carrier signal at sample intervals less than $\tau$ thereby obtaining signal samples exhibiting the characteristic amplitude variation of said recurring signal;

applying said signal samples to an input of a coincidence network comprising at least one delay circuit means which provides a delay corresponding to the period T to a passing signal sample, and input and output terminals of each delay circuit means are coupled to different inputs of an associated coincidence gate circuit means;

producing an output signal from each coincidence gate circuit means at each sample interval during which signal samples at the inputs of the coincidence gate circuit means coincide with one another;

totaling the number of output signals from all coincidence gate circuit means of said coincidence network at each sample interval;

summing the total output signals obtained in said totaling step over a time window corresponding to the duration $\tau$ of the recurring signal, and obtaining a corresponding summing signal; and defining the recurring signal by detecting peaks in the summing signal obtained during said summing step.

2. The recurring signal detecting method of claim 1, including converting said signal samples into corresponding binary signal samples.

3. The recurring signal detecting method of claim 2, including removing a direct current (DC) component from the demodulated carrier signal or from said binary signal samples, prior to applying the signal samples to the input of said coincidence network.

4. The recurring signal detecting method of claim 3, including converting each of said signal samples into a corresponding one-bit sample having a first state when the signal sample has a level greater than zero and a second state when the signal sample has a level less than zero.

5. The recurring signal detecting method of claim 1, including coupling said demodulator with a RF transmission line or an antenna at a base station transmitting said RF signal thereby producing a coupled RF signal, and performing the demodulating step on the coupled RF signal.

6. The recurring signal detecting method of claim 1, including setting the delay circuit means of said coincidence network each to provide a signal delay equal to 1 T.

7. The recurring signal detecting method of claim 1, including setting the time window in said summing step equal to τ.

8. The recurring signal detecting method of claim 1, including setting the number of said delay circuit means in said coincidence network equal to at least eight.

9. The recurring signal detecting method of claim 1, including setting a threshold level above which the peaks detected in said recurring signal defining step serve to trigger clock or timing pulses that are synchronized with the recurring signal.

10. The recurring signal detecting method of claim 9, including setting the threshold level at about 75 percent of a maximum detected summing signal.

11. The recurring signal detecting method of claim 1, including sampling the demodulated carrier signal to obtain an integer number of signal samples over the recurring signal period T.

12. The recurring signal detecting method of claim 11, including sampling the demodulated carrier signal at a rate of at least 60 signal samples per 0.75 msec duration τ of a recurring signal.

13. A system for detecting a recurring signal contained in an information signal stream which is modulated on a carrier signal, wherein the recurring signal has a known duration (τ) and repeats with a known period (T), comprising:

means for supplying a carrier signal with an information signal stream which is modulated on the carrier signal, said information signal stream containing a recurring signal having a certain duration (τ) and repeating with a certain period (T);

means for demodulating the carrier signal so that the recurring signal exhibits a certain characteristic amplitude variation in a demodulated carrier signal at an output of the demodulating means, over the recurring signal duration τ;

means for coupling an input of said demodulating means with said supplying means;

means for sampling the demodulated carrier signal at sample intervals less than τ and for obtaining corresponding signal samples exhibiting the characteristic amplitude variation of the recurring signal;

coincidence network means comprising at least one delay circuit means which provides a delay corresponding to the period T of the recurring signal to a passing signal sample, and a corresponding number of associated coincidence gate circuit means wherein each of the delay circuit means has an input and an output terminal coupled to different inputs of an associated coincidence gate circuit means;

wherein an output of said sampling means is coupled to an input of said coincidence network means, and each coincidence gate circuit means is operative to produce an output signal whenever two signal samples at its inputs coincide with one another;

adding network means having inputs coupled to corresponding outputs of the gate circuit means of said coincidence network means, for determining a total number of output signals for each sample interval;

summing circuit means having an input coupled to an output of said adding network means, for producing a summing signal indicative of total output signals from the adding network means during a time window corresponding to the duration τ of the recurring signal; and peak detector means associated with said summing circuit means for defining the recurring signal in accordance with peaks detected in the summing signal during operation of said summing circuit means.

14. A system according to claim 13, including means for converting said signal samples into corresponding binary signal samples.

15. The system of claim 14, including AC coupling means coupled to an output of said demodulator means, for removing a direct current (DC) component from the demodulated carrier signal.

16. The system of claim 15, including comparator means for converting each of said signal samples into a corresponding one-bit sample having a first state when the signal sample has a level greater than zero and a second state when the signal sample has a level less than zero.

17. The system of claim 13, including RF coupling means for coupling an input of said demodulator means with a RF transmission line or an antenna at a base station transmitting an RF signal, to produce a coupled RF signal at the input of said demodulator means.

18. The system of claim 13, including wherein the delay circuit means of said coincidence network is arranged to provide a signal delay equal to 1 T.

19. The system of claim 13, wherein said summing circuit means is arranged so that said time window is equal to τ.

20. The system of claim 13, wherein the number of said delay circuit means in said coincidence network is equal to at least eight.

21. The system of claim 13, wherein said peak detector means includes threshold means for setting a threshold level, and clock pulse trigger means for outputting clock or timing pulses that are synchronized with the recurring signal when peaks in said summing signal exceed said threshold level.

22. The system of claim 21, wherein said threshold means is operative to set the threshold level at about 75 percent of a maximum detected summing signal.

23. The system of claim 13, wherein said sampling means includes means for obtaining an integer number of signal samples over the recurring signal period T.

24. The system of claim 23, wherein said sampling means is arranged to sample the signal stream at a rate of at least 60 signal samples per 0.75 msec duration τ of a recurring signal.

25. The system of claim 13, wherein said coincidence network means comprises a stack array of more than one delay circuit means each of which is coupled with the input terminals of a different coincidence gate circuit means, and said input of the coincidence network means is an input terminal of a first delay circuit means of said stack array.

* * * * *